(12) United States Patent
Drake et al.

(10) Patent No.: US 10,598,381 B2
(45) Date of Patent: Mar. 24, 2020

(54) SWIRLER MOUNT INTERFACE FOR GAS TURBINE ENGINE COMBUSTOR

(71) Applicant: United Technologies Corporation, Hartford, CT (US)

(72) Inventors: Christopher Drake, West Hartford, CT (US); Seth A. Max, Manchester, CT (US); Meggan Harris, Colchester, CT (US)

(73) Assignee: United Technologies Corporation, Farmington, CT (US)

(*) Notice: Subject to any disclaimer, the term of this patent is extended or adjusted under 35 U.S.C. 154(b) by 428 days.

(21) Appl. No.: 14/904,872

(22) PCT Filed: May 15, 2014

(86) PCT No.: PCT/US2014/038214
§ 371 (c)(1),
(2) Date: Jan. 13, 2016

(87) PCT Pub. No.: WO2015/053818
PCT Pub. Date: Apr. 16, 2015

(65) Prior Publication Data
US 2016/0153660 A1 Jun. 2, 2016

Related U.S. Application Data

(60) Provisional application No. 61/846,110, filed on Jul. 15, 2013.

(51) Int. Cl.
*F23R 3/14* (2006.01)
*F23R 3/28* (2006.01)

(52) U.S. Cl.
CPC ............... *F23R 3/14* (2013.01); *F23R 3/283* (2013.01); *F23R 2900/00012* (2013.01); *Y02T 50/675* (2013.01)

(58) Field of Classification Search
CPC ..... F23R 3/14; F23R 3/283; F23R 3/60; F23R 3/20; Y10T 403/58; Y10T 403/581; Y10T 403/587; Y10T 403/589; F16B 39/28
(Continued)

(56) References Cited

U.S. PATENT DOCUMENTS 5,823,702 A * 10/1998 Bynum ............... F16L 19/005
403/320
6,253,538 B1 7/2001 Sampath et al.
(Continued)

FOREIGN PATENT DOCUMENTS

FR 2193141 2/1974
JP H09145058 6/1997

OTHER PUBLICATIONS

EP search report for EP14852165.1 dated Oct. 12, 2016.

*Primary Examiner* — William H Rodriguez
*Assistant Examiner* — Thomas P Burke
(74) *Attorney, Agent, or Firm* — Getz Balich LLC

(57) ABSTRACT

A swirler for a combustor of a gas turbine engine includes a swirler outer body with a swirler threaded section defined around a swirler central longitudinal axis. A bulkhead support shell for a combustor of a gas turbine engine includes a swirler boss with a boss threaded section defined around a swirler central longitudinal axis. A combustor of a gas turbine engine includes a bulkhead support shell with a swirler boss. The combustor also includes a swirler mountable to the swirler boss at a threaded interface defined around a swirler central longitudinal axis.

16 Claims, 7 Drawing Sheets

(58) Field of Classification Search
USPC .......................................................... 411/324
See application file for complete search history.

(56) References Cited

U.S. PATENT DOCUMENTS

| | | |
|---|---|---|
| 6,324,828 B1 | 12/2001 | Willis et al. |
| 6,415,610 B1 | 7/2002 | Parker |
| 7,134,286 B2 | 11/2006 | Markarian et al. |
| 7,140,189 B2 | 11/2006 | Markarian et al. |
| 7,185,497 B2 | 3/2007 | Dudebout et al. |
| 7,269,958 B2 | 9/2007 | Stastny et al. |
| 7,308,794 B2 | 12/2007 | Morenko et al. |
| 7,559,202 B2 | 7/2009 | Prociw et al. |
| 7,624,576 B2 | 12/2009 | Alkabie et al. |
| 7,658,339 B2 | 2/2010 | Prociw et al. |
| 7,716,931 B2 | 5/2010 | Mancini et al. |
| 7,721,436 B2 | 5/2010 | Prociw et al. |
| 7,950,233 B2 | 5/2011 | Alkabie et al. |
| 8,146,365 B2 | 4/2012 | Shum et al. |
| 8,171,736 B2 | 5/2012 | Hawie et al. |
| 10,088,166 B2* | 10/2018 | Drake ................ F23R 3/28 |
| 2003/0061815 A1* | 4/2003 | Young ................ B23P 6/00 60/748 |
| 2006/0020725 A1 | 1/2006 | Dropps et al. |
| 2006/0207258 A1 | 9/2006 | Tanner et al. |
| 2007/0193273 A1* | 8/2007 | DeVane ............ F23R 3/002 60/752 |
| 2008/0202122 A1* | 8/2008 | Guezengar ........ F23R 3/002 60/722 |
| 2009/0044538 A1* | 2/2009 | Pelletier ............ F23R 3/14 60/740 |
| 2011/0005231 A1 | 1/2011 | Low |
| 2012/0272660 A1 | 11/2012 | Garrett |
| 2016/0169521 A1* | 6/2016 | Drake ................ F23R 3/28 60/740 |

* cited by examiner

SWIRLER MOUNT INTERFACE FOR GAS TURBINE ENGINE COMBUSTOR

CROSS-REFERENCE TO RELATED APPLICATION

This application claims priority to PCT Patent Application No. PCT/US2014/038214 filed May 15, 2014, which claims priority to U.S. Patent Appln. Ser. No. 61/846,110 filed Jul. 15, 2013, which is hereby incorporated herein by reference in its entirety.

This disclosure was made with Government support under FA8650-09-D-2923 awarded by The United States Air Force. The Government has certain rights in this disclosure.

BACKGROUND

The present disclosure relates to a gas turbine engine and, more particularly, to a combustor therefor.

Gas turbine engines, such as those that power modern commercial and military aircraft, include a compressor section to pressurize airflow, a combustor section to burn a hydrocarbon fuel in the presence of the pressurized airflow, and a turbine section to extract energy from the resultant combustion gases.

The combustor section generally includes radially spaced inner and outer liners that define an annular combustion chamber therebetween. Arrays of circumferentially distributed combustion air holes penetrate multiple axial locations along each liner to radially admit the pressurized air into the combustion chamber. A plurality of circumferentially distributed fuel nozzles project into a forward section of the combustion chamber through a respective fuel nozzle swirler to supply the fuel to be mixed with the pressurized air.

The fuel nozzle swirler is typically brazed directly to the forward section of the bulkhead shell. Although effective and light-weight, the brazed assembly requires replacement of entire bulkhead sections to repair each fuel nozzle swirler. Alternatively, the fuel nozzle swirler can be mounted to the forward section bulkhead shell with various bolts and nuts. Although effective, the fasteners each require safety wires, which results in a relatively complicated and heavy arrangement which may also block cooling holes through the bulkhead shell. Blockage of cooling holes may further complicate these thermally challenged areas.

SUMMARY

A swirler is provided for a combustor of a gas turbine engine according to one disclosed non-limiting embodiment of the present disclosure. The swirler includes a swirler outer body with a swirler threaded section defined around a swirler central longitudinal axis.

In a further embodiment of the present disclosure, the swirler threaded section may include an external thread.

In a further embodiment of any of the foregoing embodiments of the present disclosure, the swirler threaded section may be directed defined axially along the swirler central longitudinal axis.

In a further embodiment of any of the foregoing embodiments of the present disclosure, an anti-rotation lock may be included which at least partially surrounds the swirler threaded section.

In a further embodiment of any of the foregoing embodiments of the present disclosure, the anti-rotation lock may include a multiple of circumferentially arranged arms.

In a further embodiment of any of the foregoing embodiments of the present disclosure, the anti-rotation lock may extend axially beyond the swirler threaded section.

A bulkhead support shell is provided for a combustor of a gas turbine engine according to another disclosed non-limiting embodiment of the present disclosure. The bulkhead support shell includes a swirler boss with a boss threaded section defined around a swirler central longitudinal axis.

In a further embodiment of any of the foregoing embodiments of the present disclosure, the boss threaded section may include an internal thread.

In a further embodiment of any of the foregoing embodiments of the present disclosure, the boss threaded section may be defined axially along the swirler central longitudinal axis.

In a further embodiment of any of the foregoing embodiments of the present disclosure, a ramped flange may be included that radially extends from the swirler boss.

In a further embodiment of any of the foregoing embodiments of the present disclosure, the ramped flange may be directed outward with respect to the swirler central longitudinal axis.

A combustor of a gas turbine engine is provided according to another disclosed non-limiting embodiment of the present disclosure. The combustor includes a bulkhead support shell with a swirler boss. The combustor also includes a swirler mountable to the swirler boss at a threaded mount interface defined around a swirler central longitudinal axis.

In a further embodiment of any of the foregoing embodiments of the present disclosure, the threaded mount interface may be defined by a swirler threaded section directed outward with respect to the swirler central longitudinal axis and a boss threaded section directed inward with respect to the swirler central longitudinal axis.

In a further embodiment of any of the foregoing embodiments of the present disclosure, an anti-rotation lock may be included which at least partially surrounds the threaded mount interface.

In a further embodiment of any of the foregoing embodiments of the present disclosure, the anti-rotation lock may include a multiple of circumferentially arranged arms that interfaces with a ramped flange that radially extends from the swirler boss.

In a further embodiment of any of the foregoing embodiments of the present disclosure, the anti-rotation lock may extend axially beyond the swirler threaded section.

In a further embodiment of any of the foregoing embodiments of the present disclosure, a combustor outer wall and a combustor inner wall may be included. The bulkhead support shell may extend between the combustor outer wall and a combustor inner wall.

A method of assembling a combustor is provided according to another disclosed non-limiting embodiment of the present disclosure. The method includes removably mounting a swirler to a bulkhead support shell via a threaded mount interface defined around a swirler central longitudinal axis.

In a further embodiment of any of the foregoing embodiments of the present disclosure, the method may include anti-rotation locking the swirler.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
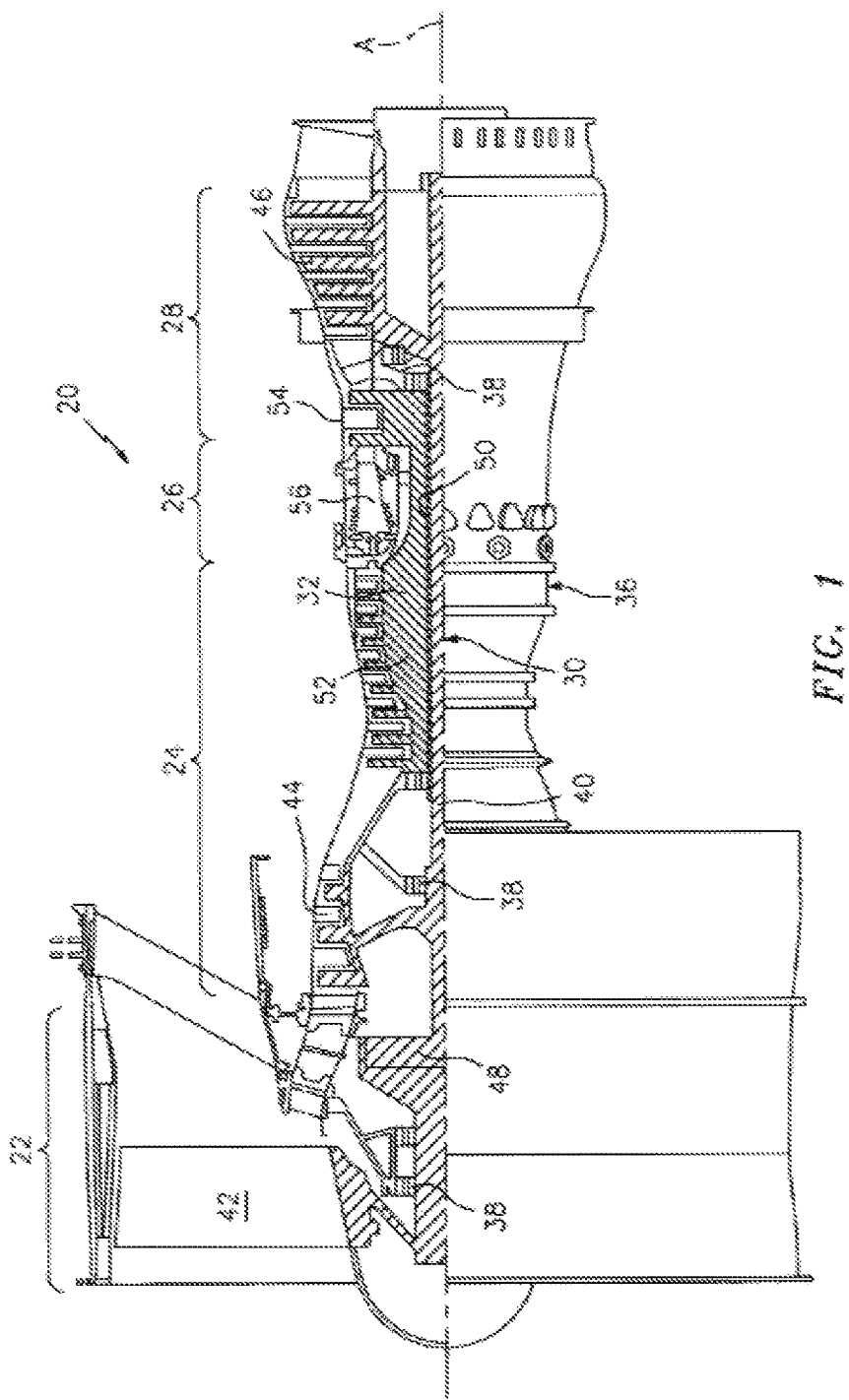
FIG. 1 is a schematic cross-section of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might also include an augmentor section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines such as a three-spool (plus fan) engine wherein an intermediate spool includes an intermediate pressure compressor (IPC) between the low pressure compressor (LPC) and the high pressure compressor (HPC) and an intermediate pressure turbine (IPT) between the high pressure turbine (HPT) and the low pressure turbine (LPT).

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 may drive the fan 42 directly, or through a geared architecture 48 as shown in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the low pressure compressor 44 and then the high pressure compressor 52, mixed with the fuel and burned in the combustor 56, then expanded over the high pressure turbine 54 and low pressure turbine 46. The turbines 54, 46 rotationally drive the respective low spool 30 and high spool 32 in response to the expansion.

The main engine shafts 40 and 50 are supported at a plurality of points by the bearing structures 38 within the static structure 36. It should be understood that various bearing structures 38 at various locations may alternatively or additionally be provided.

Figure 2:
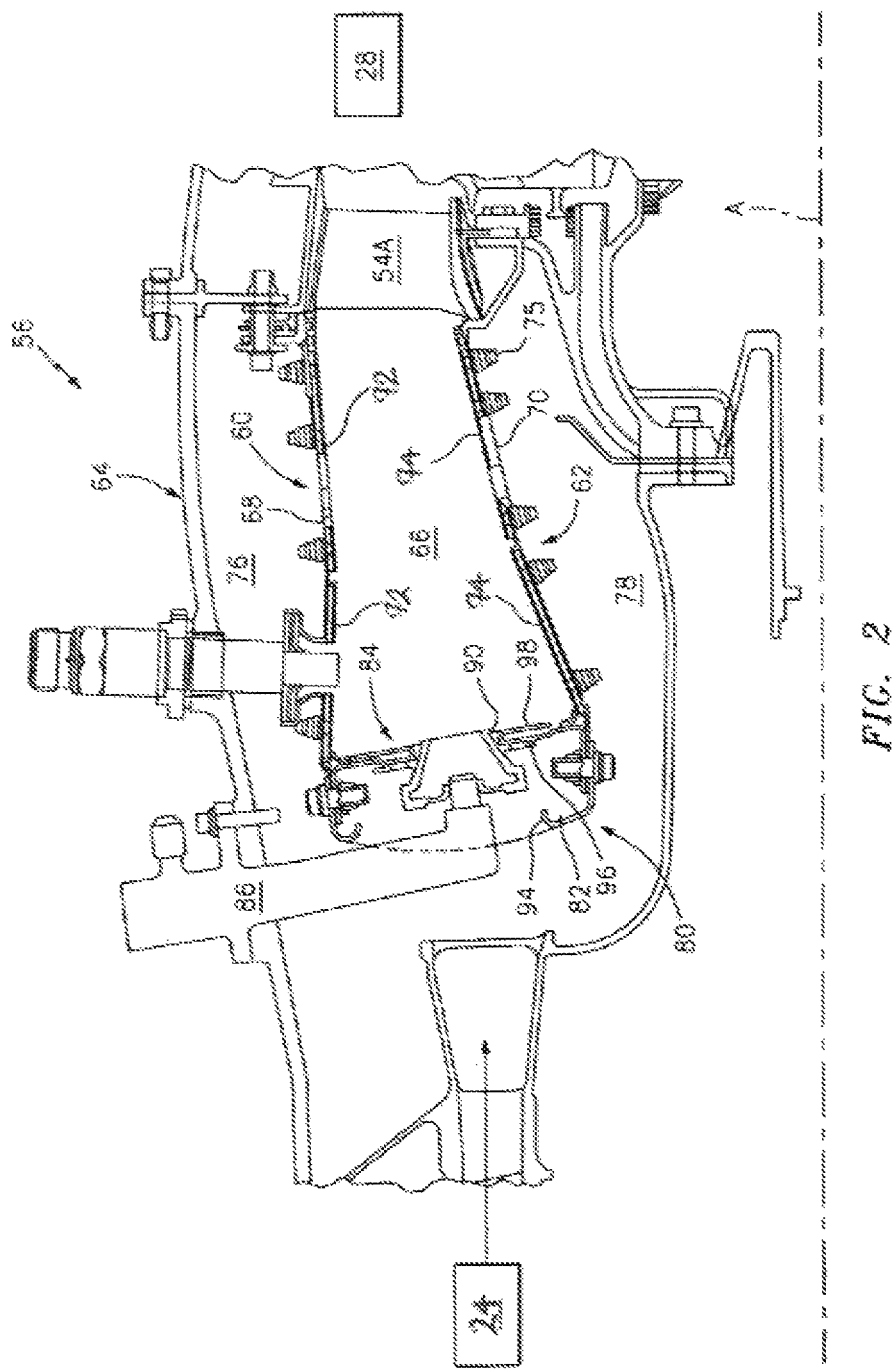
FIG. 2 is a partial sectional view of an exemplary annular combustor that may be used with the gas turbine engine shown in FIG. 1.

With reference to FIG. 2, the combustor 56 generally includes a combustor outer wall 60 and a combustor inner wall 62. The outer wall 60 and the inner wall 62 are spaced inward from a diffuser case 64. The outer wall 60 and the inner wall 62 define a chamber 66 therebetween. The chamber 66 is generally annular in shape.

The outer wall 60 and the diffuser case 64 define an annular outer plenum 76. The inner wall 62 and the diffuser case 64 define an annular inner plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

Each wall 60, 62 generally includes a respective support shell 68, 70 that supports one or more respective liners 72, 74 mounted to the respective support shell 68, 70. Each of the liners 72, 74 may be generally rectilinear and manufactured of, for example, a nickel based super alloy or ceramic material.

Figure 3:
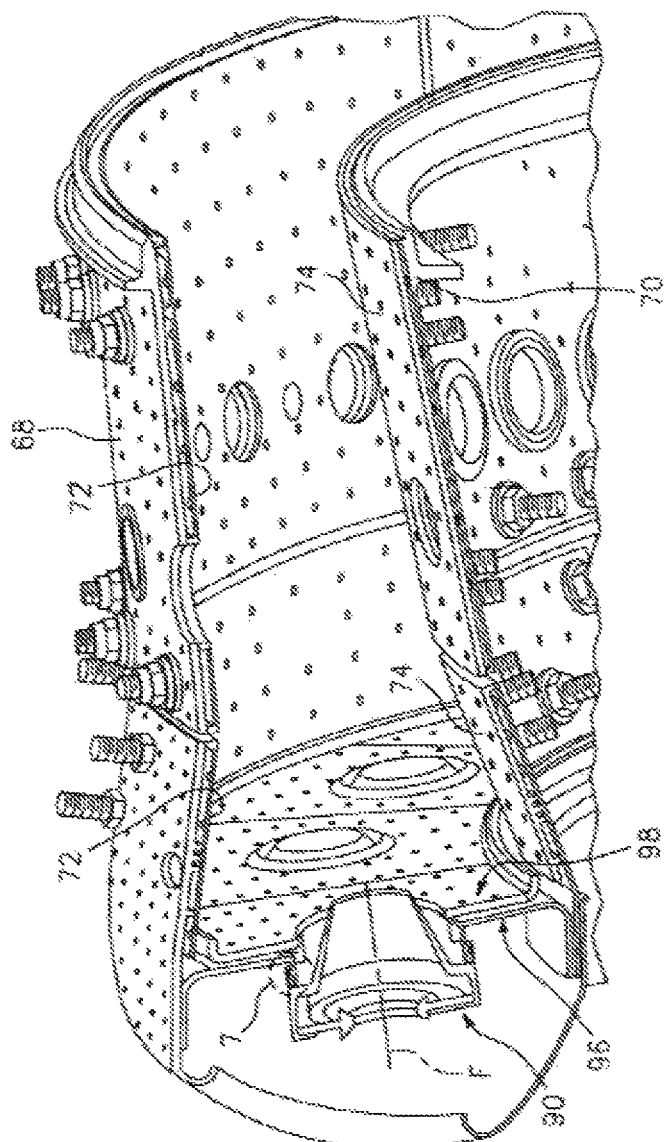
FIG. 3 is a partial perspective view of the combustor.

The combustor 56 further includes a forward assembly 80 immediately downstream of the compressor section 24 to receive compressed airflow therefrom. The forward assembly 80 generally includes an annular hood 82, a bulkhead subassembly 84, a multiple of fuel nozzles 86 (one shown) and a multiple of swirlers 90 (one shown). Each swirler 90 defines a central opening. The annular hood 82 extends radially between, and is secured to, the forwardmost ends of the walls 60, 62. The annular hood 82 includes a multiple of circumferentially distributed hood ports 94 that accommodate the respective fuel nozzle 86 and introduce air into the multiple of swirlers 90. Each fuel nozzle 86 may be secured to the outer case 64 to project through one of the hood ports 94 and through the central opening 92 of the respective swirler 90 along axis F (see FIG. 3).

Each swirler 90 is circumferentially aligned with one of the hood ports 94 to project through the bulkhead subassembly 84. Each bulkhead subassembly 84 includes a bulkhead support shell 96 secured to the walls 60, 62, and a multiple of circumferentially distributed bulkhead liners 98 secured to the bulkhead support shell 96 around the central opening 92 (also shown in FIG. 3).

The forward assembly 80 directs a portion of the core airflow into the forward end of the combustion chamber 66 while the remainder enters the annular outer plenum 76 and the annular inner plenum 78. The multiple of fuel nozzles 86, the swirler 90 and the surrounding structure generate a swirling, intimately blended fuel-air mixture that supports combustion in the chamber 66.

Figure 4:
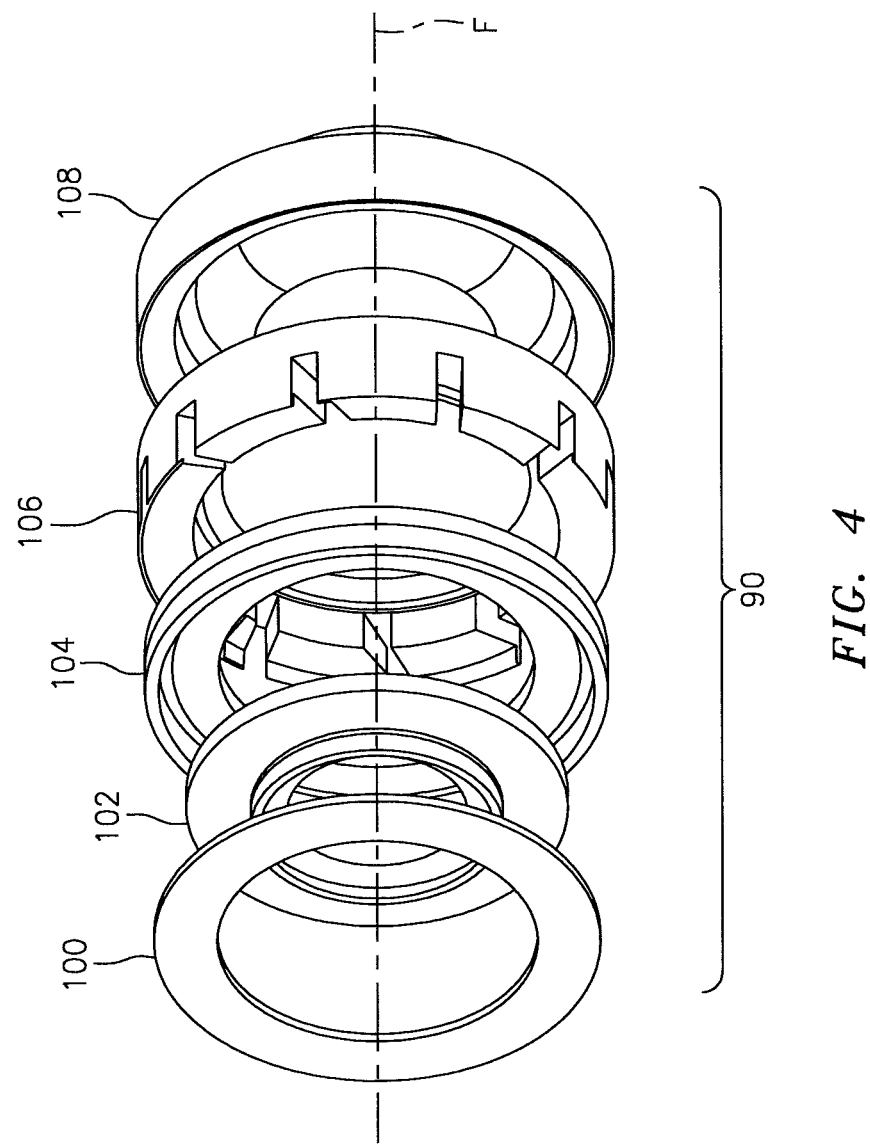
FIG. 4 is an exploded view of a swirler.
Figure 5:
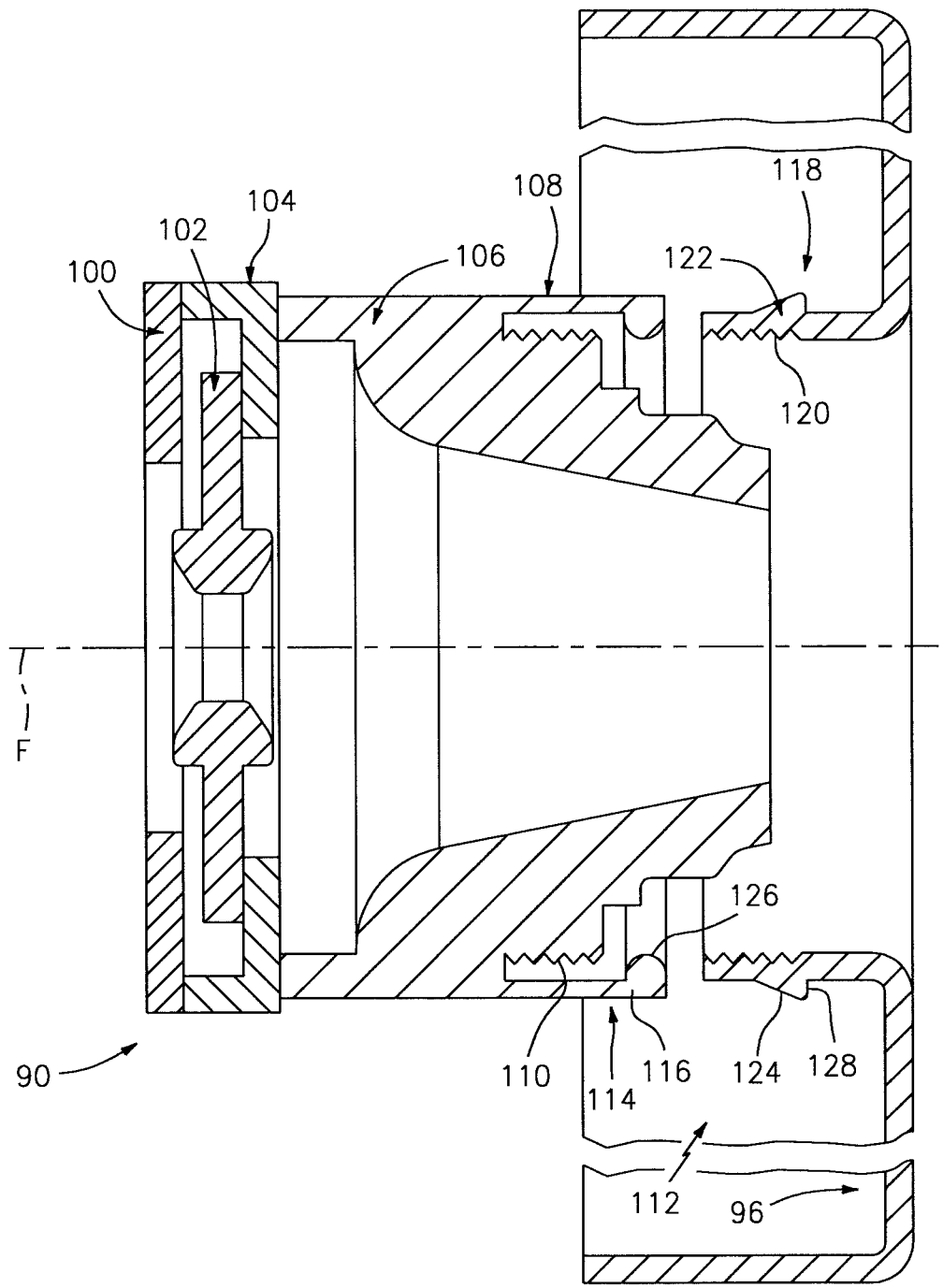
FIG. 5 is an exploded sectional view of a threaded mount interface defined by the swirler and a bulkhead support shell.

With reference to FIG. 4, each swirler 90 generally includes a capture plate 100, a nozzle guide 102, a guide housing 104, a swirler inner body 106 and a swirler outer body 108 along the swirler central longitudinal axis F. Referring to FIG. 5, the capture plate 100 is mounted to the guide housing 104 to retain the nozzle guide 102 such that the nozzle guide 102 is movable with respect to the guide housing 104. It should be appreciated that any number of swirler body components as well as alternative or additional components may be utilized herewith and that the swirler body shown is merely but one example assembly.

Each swirler 90 is attached to a respective bulkhead support shell 96 of the bulkhead subassembly 84 at a threaded mount interface 112. The threaded mount interface 112 is defined around the swirler central longitudinal axis F to facilitate removal, repair or replacement of each individual swirler 90.

The threaded mount interface 112 of the swirler outer body 108 includes a swirler threaded section 110 defined generally around the swirler central longitudinal axis F. In one disclosed non-limiting embodiment, the swirler threaded section 110 is directed around the swirler central longitudinal axis F.

Figure 6:
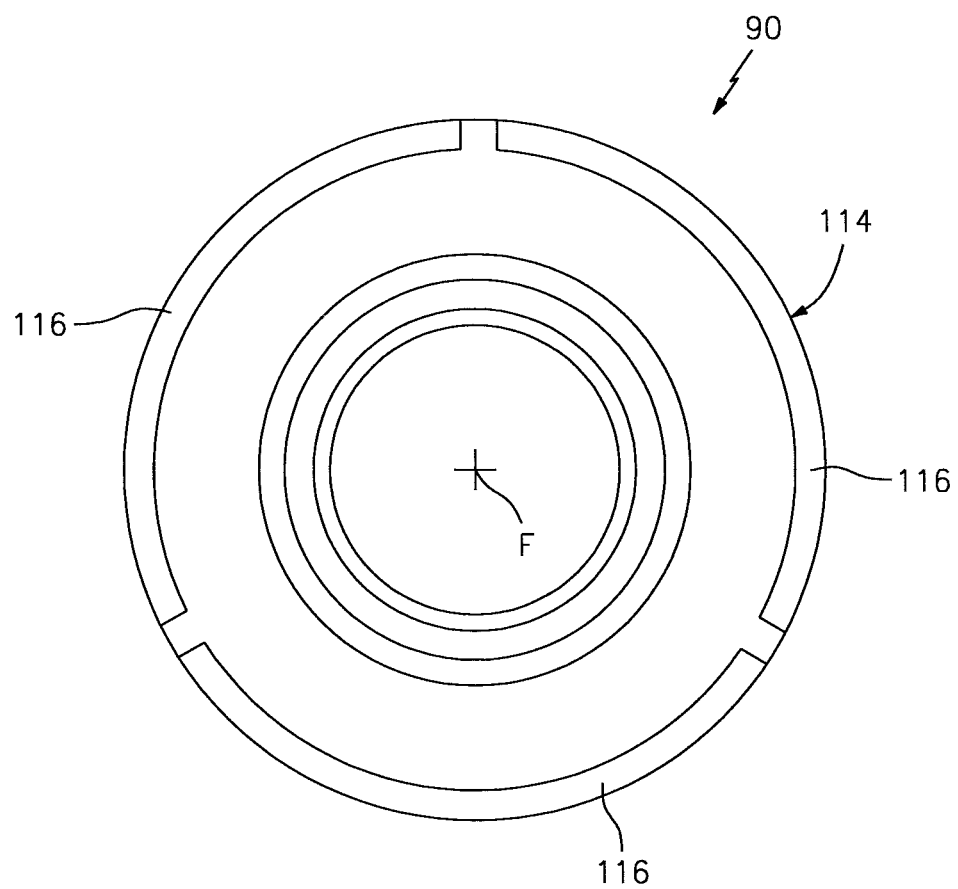
FIG. 6 is a front view of the swirler.
Figure 7:
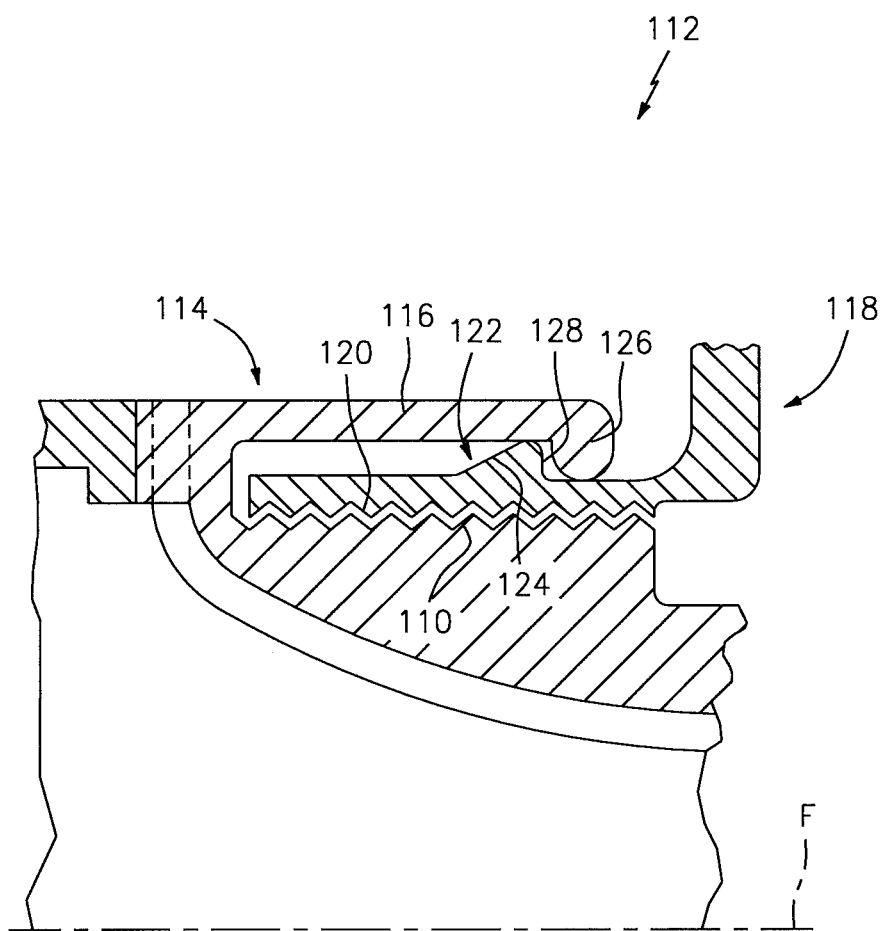
FIG. 7 is an enlarged sectional view of the threaded mount interface with the swirler engaged with the bulkhead support shell in an installed configuration.

An anti-rotation lock 114 at least partially surrounds and extends axially beyond the swirler threaded section 110. The anti-rotation lock 114 includes a multiple of circumferentially arranged arms 116 (see FIGS. 5-7) that may flex radially outward as the swirler 90 is threaded to the bulkhead support shell 96. That is, the circumferentially arranged arms 116 may snap onto the swirler 90. It should be appreciated that radial as defined herein is generally with respect to the swirler central longitudinal axis F but may include other flexible components.

Each bulkhead support shell 96 includes a swirler boss 118 with a boss threaded section 120 defined around the swirler central longitudinal axis F. The boss threaded section 120 defines a portion of the threaded mount interface 112 operable to receive the swirler threaded section 110. In one disclosed non-limiting embodiment, the threads of the boss threaded section 120 is directed inward with respect to the swirler central longitudinal axis F.

The swirler boss 118 also defines a ramped flange 122 that radially extends in an outward direction with respect to the swirler central longitudinal axis F. The ramped flange 122 provides an interface surface to outwardly flex the multiple of circumferentially arranged arms 116 as the swirler 90 is threaded into the boss threaded section 120. That is, the swirler threaded section 110 is threaded into the boss threaded section 120 such that the opposed multiple of circumferentially arranged arms 116 ride up a ramp surface 124 of the ramped flange 122 until the swirler 90 is fully installed and a lip 126 which radially extends toward the swirler central longitudinal axis F snaps over a step surface 128 of the of the ramped flange 122 (see FIG. 7). The ramped flange 122 and the opposed multiple of circumferentially arranged arms 116 thereby provide the anti-rotation lock 114 which prevents the swirler 90 from axially backing out.

Removal of the swirler 90 may include merely unscrewing the swirler 90 to drive the multiple of circumferentially arranged arms 116 back over the ramped flange 122. Although more force may be required to unscrew the swirler 90 rather than to screw in the swirler 90, such forces may still be readily accomplished manually.

The threaded mount interface 112 provides a robust removable joint with minimal components that facilitates ready replacement of the swirler 90. It should be appreciated that various coating may be applied to the threaded mount interface 112 to minimize the possibility of thread lock. Moreover, the anti-rotation lock 114 provides a secure fail-safe redundant retention for the threaded mount interface 112.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with one or more features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An apparatus for a combustor of a gas turbine engine, the apparatus comprising:
a swirler for the combustor of the gas turbine engine, the swirler comprising a swirler body with a swirler threaded section defined around a swirler central longitudinal axis; and
an anti-rotation lock which at least partially surrounds said swirler threaded section;
said anti-rotation lock including a multiple of circumferentially arranged arms, wherein said multiple of circumferentially arranged arms are configured to flex radially outward as said swirler body is threaded onto a support shell and to snap onto said support shell when said swirler body is fully installed;
said swirler threaded section including an external thread;
said multiple of circumferentially arranged arms projecting in a first axial direction away from said swirler body; and
an outer surface of said swirler body tapering radially inward as said outer surface extends in the first axial direction away from said swirler threaded section towards an axial distal end of said swirler body.

2. The apparatus as recited in claim 1, wherein said swirler threaded section is defined axially along said swirler central longitudinal axis.

3. The apparatus as recited in claim 1, wherein said anti-rotation lock extends axially beyond said swirler threaded section.

4. A combustor of a gas turbine engine, the combustor comprising:
    a bulkhead support shell with a swirler boss, said swirler boss comprising a boss threaded section; and
    a swirler mountable to said swirler boss at a threaded mount interface defined around a swirler central longitudinal axis;
    the swirler comprising a swirler body with a swirler threaded section and an anti-rotation lock at least partially surrounding said threaded mount interface, wherein an outer surface of said swirler body tapers radially inward as said outer surface extends in an axial direction away from said swirler threaded section towards an axial distal end of said swirler body; and
    said anti-rotation lock comprising a plurality of circumferentially arranged arms, wherein said multiple of circumferentially arranged arms are configured to flex radially outward as said swirler is threaded onto said bulkhead support shell and to snap onto said bulkhead support shell;
    said threaded mount interface defined by said swirler threaded section and said boss threaded section, said swirler threaded section directed outward with respect to said swirler central longitudinal axis, and said boss threaded section directed inward with respect to said swirler central longitudinal axis.

5. The combustor as recited in claim 4, wherein said plurality of circumferentially arranged arms are configured to interface with a ramped flange that radially extends from said swirler boss.

6. The combustor as recited in claim 5, wherein said anti-rotation lock extends axially beyond said swirler threaded section.

7. The combustor as recited in claim 4, further comprising a combustor outer wall and a combustor inner wall, said bulkhead support shell extends between said combustor outer wall and a combustor inner wall.

8. A method of assembling a combustor, the method comprising:
    removably mounting a swirler to a bulkhead support shell using a threaded mount interface defined around a swirler central longitudinal axis, said swirler comprising a swirler body having an outer surface tapering radially inward as said outer surface extends in an axial direction away from a threaded section of said swirler towards an axial distal end of said swirler body; and
    locking said swirler to said bulkhead support shell using a plurality of circumferentially arranged arms included with said swirler, wherein said plurality of circumferentially arranged arms flex radially outward as said swirler is threaded onto the bulkhead support shell and snap onto said bulkhead support shell to lock said swirler to said bulkhead support shell;
    wherein said threaded mount interface is defined in part by the threaded section of said swirler, and said swirler threaded section is directed outward with respect to said swirler central longitudinal axis.

9. The method as recited in claim 8, wherein the locking comprises anti-rotation locking the swirler.

10. The combustor of claim 4, wherein said boss threaded section is defined around a swirler central longitudinal axis.

11. The combustor of claim 4, wherein said boss threaded section is axially along said swirler central longitudinal axis.

12. The combustor of claim 4, wherein said bulkhead support shell comprises a ramped flange that radially extends from said swirler boss.

13. The combustor of claim 12, wherein said ramped flange is directed outward with respect to said swirler central longitudinal axis.

14. The apparatus of claim 1, wherein the anti-rotation lock extends axially beyond the swirler threaded section.

15. The combustor of claim 4, wherein the anti-rotation lock extends axially beyond the swirler threaded section.

16. The combustor of claim 4, wherein the plurality of circumferentially arranged arms are configured to interface with a ramped flange that radially extends from the swirler boss.

* * * * *